US012145182B2

(12) United States Patent
Prakash et al.

(10) Patent No.: US 12,145,182 B2
(45) Date of Patent: Nov. 19, 2024

(54) CLEANING SYSTEMS AND METHODS OF USE THEREOF

(71) Applicant: THE BOEING COMPANY, Chicago, IL (US)

(72) Inventors: Om Prakash, Bangalore (IN); Sandeep Tripathi, Kanpur (IN); Megha Sahu, Bangalore (IN); Kamaraj Kandhasamy, Bangalore (IN); Carolyn L. Kupper, Summerville, SC (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 16/900,828

(22) Filed: Jun. 12, 2020

(65) Prior Publication Data

US 2021/0387239 A1 Dec. 16, 2021

(51) Int. Cl.
*B08B 9/035* (2006.01)
*B08B 3/10* (2006.01)
(Continued)

(52) U.S. Cl.
CPC .............. *B08B 9/035* (2013.01); *B08B 3/104* (2013.01); *B08B 9/032* (2013.01); *B08B 9/0323* (2013.01);
(Continued)

(58) Field of Classification Search
CPC . B08B 9/00–46; B08B 2209/032; B08B 5/04; B08B 3/00–14; B64F 5/30;
(Continued)

(56) References Cited

U.S. PATENT DOCUMENTS 2,801,824 A * 8/1957 Taprogge .................. F28G 1/12 134/22.12
3,641,743 A 2/1972 Hoffman et al.
(Continued)

FOREIGN PATENT DOCUMENTS

CN 104707824 A 6/2015
CN 205102670 U 3/2016
(Continued)

OTHER PUBLICATIONS

J. C. Kim & K. W. Lee (1990) Experimental Study of Particle Collection by Small Cyclones, Aerosol Science and Technology, 12:4, 1003-1015. O. A. Sinkevich (2006) Mechanisms Leading to Tornado.
(Continued)

*Primary Examiner* — Natasha N Campbell
*Assistant Examiner* — Richard Z. Zhang
(74) *Attorney, Agent, or Firm* — Patterson + Sheridan, LLP

(57) ABSTRACT

The present disclosure provides a cleaning system, including a first sub-chamber, a second sub-chamber adjacent to the first sub-chamber, and a third sub-chamber adjacent to the second sub-chamber. A first divider is positioned between the first and the second sub-chambers. A second divider is positioned between the second and the third sub-chambers. A vacuum system is coupled to the third sub-chamber to generate a vacuum pressure in the third sub-chamber that is less than a pressure of the first sub-chamber to create a pressure differential to induce a pressurized flow of a first cleaning media from the first sub-chamber to the third sub-chamber through an internal passage of a component positioned in the second sub-chamber. A filtering system is coupled to the first sub-chamber and the third sub-chamber to remove and filter the first cleaning media from the third
(Continued)

sub-chamber and return the first cleaning media to the first sub-chamber.

23 Claims, 5 Drawing Sheets

(51) Int. Cl.
*B08B 9/023* (2006.01)
*B08B 9/032* (2006.01)

(52) U.S. Cl.
CPC ............. *B08B 9/023* (2013.01); *B08B 9/0321* (2013.01); *B08B 2209/032* (2013.01)

(58) Field of Classification Search
CPC ...... F01D 25/002; F02B 77/04; F02B 77/145; A61M 2025/0019; A61B 1/123; A61B 1/125; F24H 9/00–457; F28D 7/16–1692; F28F 9/04; F28F 9/06–14; B24C 1/00–10; B24C 3/00–34; F28G 7/00–005; F28G 9/00–005; F22B 37/48–545
See application file for complete search history.

(56) References Cited

U.S. PATENT DOCUMENTS

| | | | | | |
|---|---|---|---|---|---|
| 4,645,542 | A | * | 2/1987 | Scharton | F28G 7/005 134/22.12 |
| 5,037,955 | A | * | 8/1991 | Dighton | B01J 19/2415 165/145 |
| 5,289,838 | A | | 3/1994 | Odell | |
| 5,529,635 | A | | 6/1996 | Odell | |
| 5,841,826 | A | * | 11/1998 | Rootham | F28G 7/00 134/1 |
| 8,448,655 | B2 | | 5/2013 | Suzuki et al. | |
| 10,486,206 | B2 | | 11/2019 | Carson | |
| 2003/0102011 | A1 | * | 6/2003 | Smith | B08B 9/057 134/8 |
| 2009/0000142 | A1 | | 1/2009 | Churchill et al. | |
| 2010/0050885 | A1 | | 3/2010 | Vanderstegen-Drake | |
| 2010/0226771 | A1 | | 9/2010 | Crawford et al. | |
| 2010/0243208 | A1 | * | 9/2010 | Kar | F28F 13/125 165/157 |
| 2011/0214249 | A1 | | 9/2011 | McLeod et al. | |
| 2011/0214250 | A1 | | 9/2011 | McLeod et al. | |
| 2011/0214252 | A1 | | 9/2011 | McLeod et al. | |
| 2012/0011680 | A1 | | 1/2012 | Owen et al. | |
| 2013/0011252 | A1 | | 1/2013 | Crawford et al. | |
| 2013/0323025 | A1 | | 12/2013 | Crawford et al. | |
| 2013/0323100 | A1 | | 12/2013 | Poulton et al. | |
| 2014/0137422 | A1 | | 5/2014 | Gammack et al. | |
| 2014/0141710 | A1 | | 5/2014 | Turrini-Rochford et al. | |
| 2014/0190523 | A1 | | 7/2014 | Garvey et al. | |
| 2014/0255173 | A1 | | 9/2014 | Poulton et al. | |
| 2015/0320268 | A1 | | 11/2015 | Steele et al. | |
| 2016/0338466 | A1 | | 11/2016 | Atkinson et al. | |
| 2017/0065368 | A1 | | 3/2017 | Garvey et al. | |
| 2018/0055212 | A1 | | 3/2018 | Follows et al. | |
| 2018/0116495 | A1 | | 5/2018 | Karpiel, Jr. et al. | |
| 2018/0116774 | A1 | | 5/2018 | Coleman et al. | |
| 2018/0142966 | A1 | * | 5/2018 | Dowell | F28F 9/185 |
| 2018/0289456 | A1 | | 10/2018 | Follows et al. | |
| 2019/0195566 | A1 | * | 6/2019 | Zhang | F28G 9/00 |
| 2019/0234190 | A1 | * | 8/2019 | Takahashi | F24T 10/17 |
| 2020/0386481 | A1 | * | 12/2020 | Egolf | F28D 7/0066 |

FOREIGN PATENT DOCUMENTS

| | | | | | |
|---|---|---|---|---|---|
| CN | 105945003 | A | | 9/2016 | |
| CN | 106152487 | A | * | 11/2016 | |
| CN | 106152867 | A | | 11/2016 | |
| CN | 106511376 | A | | 3/2017 | |
| CN | 106824909 | A | | 6/2017 | |
| CN | 107687777 | A | * | 2/2018 | |
| CN | 207222436 | U | * | 4/2018 | |
| CN | 108444316 | A | * | 8/2018 | |
| CN | 209295728 | U | | 8/2019 | |
| CN | 209745092 | U | * | 12/2019 | |
| CN | 110788070 | A | | 2/2020 | |
| CN | 210374772 | U | * | 4/2020 | |
| CN | 210546687 | U | | 5/2020 | |
| DE | 102013218747 | A1 | | 3/2015 | |
| KR | 20120043834 | A | * | 5/2012 | F28G 1/12 |
| KR | 20150127696 | A | | 11/2015 | |
| KR | 101994963 | B1 | | 7/2019 | |

OTHER PUBLICATIONS

Generation and Sustainment, Heat Transfer Research, 2006, vol. 37, No. 8, 731-752.

A. Yu. Varaksin Clusterization of Particles in Turbulent and Vortex Two-phase Flows, published in Teplofizika Vysokikh Temperature, 2014, vol. 52, No. 5, pp. 777-796.

European Patent Office, Extended European Search Report for Application 21178782.5 dated Oct. 19, 2021.

European Patent Office, Communication Pursuant to Article 94(3) EPC for Application 21 178 782.5-1103 Dated Jan. 16, 2023.

China National Intellectual Property Administration, Chinese Patent Application No. 202110662527.0, dated Mar. 29, 2024.

China National Intellectual Property Administration, Second Notification of Office Action for Chinese Patent Application No. 202110662527.0, dated Aug. 20, 2024.

* cited by examiner

CLEANING SYSTEMS AND METHODS OF USE THEREOF

FIELD

Aspects of the present disclosure relate to cleaning passages of industrial equipment as well as internal passages of parts and assemblies that may be fabricated using industrial equipment.

BACKGROUND

Various types of industrial equipment can be employed to fabricate and assemble parts across multiple industries. This industrial equipment can include engineering components having one or more internal passages. Similarly, the parts fabricated by this industrial equipment or fabricated in other ways can also include one or more internal passages. The internal passages of various components, as well as parts fabricated and assembled using industrial equipment, can accumulate buildup of contaminants in their internal passages. The buildup in these internal passages can be challenging to remove given where the buildup is located. Further, the cleaning methods used to remove the buildup can leave behind residue that can be hazardous to the future use of both the industrial equipment and various components. Thus, there remains a need for an improved method of cleaning internal passages.

SUMMARY

The present disclosure provides a cleaning system. In one aspect, the cleaning system including a cleaning chamber, the cleaning chamber including a first sub-chamber configured to retain a first cleaning media; a second sub-chamber adjacent to the first sub-chamber; and a first divider positioned between the first sub-chamber and the second sub-chamber, the first divider having a first aperture formed therein. The cleaning chamber further includes a third sub-chamber adjacent to the second sub-chamber and configured to receive the first cleaning media; and a second divider positioned between the second sub-chamber and the third sub-chamber, the second divider having a second aperture formed therein, the first aperture and the second aperture being configured to form a fluid path through the second sub-chamber. The cleaning system further includes a vacuum system coupled to the third sub-chamber, the vacuum system being configured to generate a pressure in the third sub-chamber that is less than a pressure of the first sub-chamber to induce a pressurized flow of the first cleaning media from the first sub-chamber to the third sub-chamber; and a filtering system coupled to the first sub-chamber and the third sub-chamber, the filtering system being configured to remove and filter the first cleaning media from the third sub-chamber and return the first cleaning media to the first sub-chamber.

In one aspect, in combination with any example cleaning system above or below, the cleaning system further includes a first coupling mechanism removably coupled to the first divider via a first through-hole of a first plurality of through-holes, and a second coupling mechanism removably coupled to the second divider via a second through-hole of a second plurality of through-holes.

In one aspect, in combination with any example cleaning system above or below, the cleaning system further includes a component positioned in the second sub-chamber, the component having a first end of the component being removably coupled to the first coupling mechanism, a second end of the component being removably coupled to the second coupling mechanism, an outside surface, and an inside surface, the inside surface defining at least one internal passage extending from the first end of the component to the second end of the component.

In one aspect, in combination with any example cleaning system above or below, the cleaning system further includes each of the first coupling mechanism and the second coupling mechanism being at least one of a press-fit mechanism, a clamp, an adhesive, or a magnetic chuck.

In one aspect, in combination with any example cleaning system above or below, the cleaning system further includes a temperature controller coupled to the first sub-chamber, the temperature controller being configured to modulate a temperature of the first sub-chamber.

In one aspect, in combination with any example cleaning system above or below, the cleaning system further includes a first vessel coupled to the first sub-chamber, the first vessel having the first cleaning media therein and being configured to transport the first cleaning media into the first sub-chamber.

In one aspect, in combination with any example cleaning system above or below, the cleaning system further includes a second vessel coupled to the second sub-chamber, the second vessel having a second cleaning media and being configured to transport the second cleaning media into the second sub-chamber.

The present disclosure provides a cleaning system. In one aspect, the cleaning system including a plurality of cleaning chambers. Each cleaning chamber of the plurality of cleaning chambers including a first sub-chamber, the first sub-chamber configured to retain a first cleaning media; an agitator coupled to the first sub-chamber, the agitator being configured to initiate and maintain a rotational velocity of the first cleaning media; a second sub-chamber adjacent to the first sub-chamber; a first divider positioned between the first sub-chamber and the second sub-chamber, the first divider having a first plurality of apertures formed therein; a third sub-chamber adjacent to the second sub-chamber and configured to receive the first cleaning media; and a second divider positioned between the second sub-chamber and the third sub-chamber, the second divider having a second plurality of apertures formed therein, each first aperture of the plurality of first apertures and each second aperture of the plurality of second apertures being configured to form a fluid path through the second sub-chamber. The cleaning system further includes a vacuum system coupled the third sub-chamber of each cleaning chamber of the plurality of cleaning chambers, the vacuum system being configured to generate a pressure in the third sub-chamber, the pressure of the third sub-chamber being less than a pressure of the first sub-chamber to induce a pressurized flow of the first cleaning media from the first sub-chamber to the third sub-chamber; and a filtering system coupled to the first sub-chamber and the third sub-chamber of each cleaning chamber of the plurality of cleaning chambers, the filtering system being configured to remove and filter the first cleaning media from the third sub-chamber of each cleaning chamber and return the filtered first cleaning media to the first sub-chamber of each cleaning chamber.

In one aspect, in combination with any example cleaning system above or below, the cleaning system further includes a first coupling mechanism removably coupled to the first divider via an aperture of the first plurality of apertures; and a second coupling mechanism removably coupled to the second divider via an aperture of the second plurality of apertures.

In one aspect, in combination with any example cleaning system above or below, the cleaning system further includes a component positioned in the second sub-chamber of at least one cleaning chamber of the plurality of cleaning chambers. The component has a first end of the component being removably coupled to the first coupling mechanism, a second end of the component being removably coupled to the second coupling mechanism, an outside surface, and an inside surface, the inside surface defining at least one internal passage extending from the first end of the component to the second end of the component.

In one aspect, in combination with any example cleaning system above or below, the cleaning system further includes a first vessel coupled to the first sub-chamber of each cleaning chamber, the first vessel including the first cleaning media and being configured to transport the first cleaning media into the first sub-chamber.

In one aspect, in combination with any example cleaning system above or below, the cleaning system further includes a second vessel coupled to the second sub-chamber of each cleaning chamber, the second vessel including a second cleaning media and being configured to transport the second cleaning media into the second sub-chamber.

In one aspect, in combination with any example cleaning system above or below, the cleaning system further includes at least one pressure sensor coupled to the first sub-chamber, the second sub-chamber, or the third sub-chamber.

The present disclosure provides a method of using cleaning system. In one aspect, a method of using cleaning system including executing a cleaning program. The cleaning program includes creating, initiating a first pressure cycle of the cleaning program, a first cleaning media being in a first sub-chamber of a cleaning chamber, the first sub-chamber having a first pressure; activating, during the first pressure cycle, a vacuum system coupled to a third sub-chamber of the cleaning chamber to establish a second pressure in the third sub-chamber, the second pressure being less than the first pressure, the third sub-chamber being separated from the first sub-chamber by a second sub-chamber, the second sub-chamber having a component positioned therein, the component having an outside surface and an inside surface, the inside surface defining at least one internal passage, and the component being removably coupled to the first sub-chamber via a first coupling mechanism and to the third sub-chamber via a second coupling mechanism; forming, during the first pressure cycle, in response to the second pressure being less than the first pressure, a first pressurized flow of the first cleaning media from the first sub-chamber through the at least one internal passage of the component to the third sub-chamber to remove a plurality of contaminants from the at least one internal passage of the component; and de-activating, during the first pressure cycle, the vacuum system. The first pressurized flow of the first cleaning media is not present in the second sub-chamber when the vacuum system is deactivated.

In one aspect, in combination with any example cleaning method above or below, the method of using the cleaning system further includes executing a first filtering cycle, the first filtering cycle being included in the cleaning program. The first filtering cycle includes transporting the first cleaning media from the third sub-chamber to a filtering system, the filtering system being coupled to the third sub-chamber and the first sub-chamber. The filtering system removes the plurality of contaminants from the first cleaning media to form a filtered first cleaning media; and transporting, via the filtering system, the filtered first cleaning media to the first sub-chamber.

In one aspect, in combination with any example cleaning method above or below, the method of using the cleaning system further includes the cleaning program including executing a plurality of filtering cycles prior to deactivating the vacuum system.

In one aspect, in combination with any example cleaning method above or below, the method of using the cleaning system further includes, subsequent to the first filtering cycle, creating, during a second pressure cycle, a rotational velocity of the filtered first cleaning media while the first sub-chamber is at the first pressure; activating, during the second pressure cycle, the vacuum system to establish a third pressure in the third sub-chamber while the component is removably coupled to the first sub-chamber via the first coupling mechanism and to the third sub-chamber via the second coupling mechanism, the third pressure being less than the first pressure; and forming, during the second pressure cycle, in response to the third pressure being less than the first pressure, a second flow of the first cleaning media from the first sub-chamber through the at least one internal passage of the component to the third sub-chamber to remove a plurality of contaminants from the at least one internal passage of the component.

In one aspect, in combination with any example cleaning method above or below, the method of using the cleaning system further includes disposing, during the executing of the cleaning program, a second cleaning media into the second sub-chamber to remove contaminants from the outside surface of the component.

In one aspect, in combination with any example cleaning method above or below, the method of using the cleaning system further includes the first pressure being about atmospheric pressure and the second pressure being from about 0.01 Pascal (Pa) to about 1 Pa.

In one aspect, in combination with any example cleaning method above or below, the method of using the cleaning system further includes the first cleaning media being selected from the group consisting of a surfactant, a degreasing liquid, a degreasing gas, ambient air, nitrogen, $CO_2$, and combinations thereof.

In one aspect, in combination with any example cleaning method above or below, the method of using the cleaning system further includes the first cleaning media having a plurality of particles having an average diameter from about 0.5 mm to about 3 mm.

In one aspect, in combination with any example cleaning method above or below, the method of using the cleaning system further includes the plurality of particles being selected from the group consisting of polymeric particles, ceramic particles, glass particles, and combinations thereof.

In one aspect, in combination with any example cleaning method above or below, the method of using the cleaning system further includes that the first pressurized flow is a linear flow.

In one aspect, in combination with any example cleaning method above or below, the method of using the cleaning system further includes, during the first pressure cycle, agitating the first cleaning media to establish a rotational velocity of the first cleaning media, wherein the first pressurized flow formed from the first cleaning media having the rotational velocity is a vortex.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
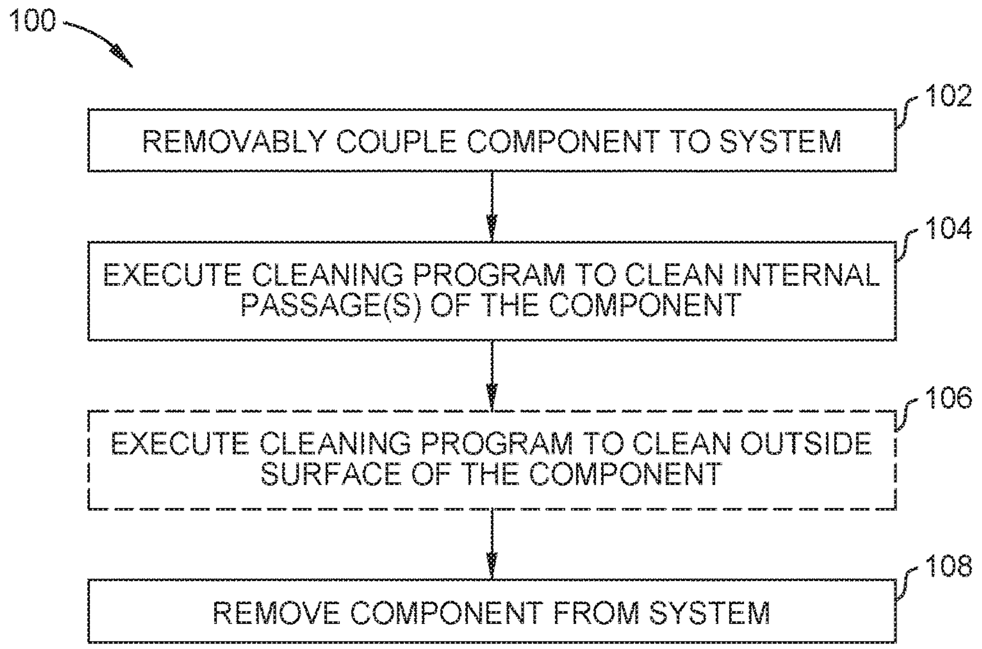
FIG. 1 depicts an example of flow chart of a method of using a cleaning system according to aspects of the present disclosure.

The present disclosure relates to systems and methods of cleaning using pressure differentials to form one or more pressurized flows. The internal passages can be included in components used in various types of industrial equipment or on parts and assemblies (referred to collectively as "components" herein) fabricated using the industrial equipment, or fabricated using other methods and equipment. As discussed herein, "industrial equipment" can be various types of machinery be used to make, assemble, clean, inspect, and otherwise fabricate components, for example, aerospace components. The components can include mechanical components, electrical components, or electro-mechanical components. Components such as tubes, hoses, conduits, joints, and other connectors and channels, can each include one or more internal passages. The internal passages of the components can accumulate a buildup of contaminants that can be challenging to clean. The contaminants discussed herein can be solids, liquids, or colloids, and can include various process agents used on the industrial equipment, such as degreasers or other solvents, as well as dirt, dust, animal life (e.g., insects), plant life, metal chips resulting from machining, or other foreign-object-debris (FOD) or undesired elements that may negatively impact component function via clogging or contamination.

Current methods of cleaning internal passages may not be sufficient since internal passages can have small, thin, or narrow cross-sections; varying cross-sectional sizes and geometries; twisting, kinked, wound, or other unique geometries; and/or corners. Current cleaning methods can be quite both tedious and time consuming due to the combination of contaminant build-up and geometry of the internal passages. Further, currently employed cleaning methods can leave behind contaminants that are not removed, and can additionally leave behind cleaning media used as a part of the cleaning process.

Accordingly, the systems and methods discussed herein can be used to clean components having one or more internal passages of varying cross-sectional shape and geometries without leaving behind residue. The systems and methods discussed herein use enhanced forces generated by forming and controlling a pressurized flow in response to a pressure differential between two environments. The pressurized flow can be directed through one or more internal passages in a plurality of iterations. As discussed herein, a "pressurized flow" is a flow of one or more materials that is established along a path based upon at least a pressure differential between a first environment, such as a sub-chamber, and a second environment, such as a different sub-chamber. The one or more materials can include a cleaning media. The pressurized flow can be used to carry fluids and solids, or a mix of types of cleaning media along the path, which can comprise one or more internal passages of a component. As used herein, "fluids" can include materials in liquid or gaseous phases, including bubbles of gas. The cleaning media can be a single phase media or a multi-phase media in various configurations. A single phase media could be one of: a liquid such as water ($H_2O$) cleaning media, a gas, a solvent, or a solid such as a particulate matter that may be used alone to remove contaminants from an internal passage. A multi-phase media could include 1) water and a solvent vapor, 2) a solvent liquid and a solvent vapor, 3) water, a solvent, and a plurality of particles, or any combinations thereof. In some examples, a plurality of bubbles could be introduced into a single phase or a multi-phase cleaning media. In other examples, a colloidal or dispersion mixture (multi-phase media) could be used as the cleaning media.

The pressurized flow can be configured in various manners, including a linear flow or a vortex. A "linear" flow can be a flow of cleaning media substantially along a central axis of the internal passage of the component. In contrast, as used herein, a "vortex" is a pressurized flow of cleaning media that has a rotational velocity. As used herein, a "rotational velocity" of a media such as a cleaning media is used to mean that the cleaning media has a circular velocity such that a pressure differential creates a spiral flow through one or more fluid paths. Accordingly, the vortex can include a pressurized flow of cleaning media through the internal passage along a spiral flow path. The vortex proceeds along the central axis of the internal passage of the component while rotating at an angle relative to that central axis. In this example, the cleaning media from which the vortex is formed has a rotational velocity that is maintained or increased as the cleaning media is transported along the internal passage. In some examples, the cleaning media may rotate at an angle of 30° (degrees), 60°, or 90° relative to the central axis of the internal passage. The cleaning methods discussed herein can be used, for example, to clean tubular structures with multiple bends, since the pressurized flow is able to navigate through complex parts relatively easily in contrast to current cleaning methods. Further, the pressurized flow of cleaning media does not leave behind residue which can cause a fire hazard, equipment contamination, and/or other performance issues once the component is put back into service after cleaning. The systems and methods discussed herein can be used to control the formation and direction of the pressurized flow via the pressure differential between the first and second environments to remove contaminants without leaving behind undesirable residue. Accordingly, the systems and methods discussed herein result in much higher cleaning rates and improved cleaning efficiencies as compared to current cleaning methods.

The cleaning systems discussed herein have at least one cleaning chamber divided into multiple sub-chambers, the combination of which can be referred to as a "sub-chamber stack" as discussed in detail below. In one example, a component is coupled to the cleaning chamber using a plurality of coupling mechanisms. As discussed herein, a "coupling mechanism" is a device configured to secure two or more elements of a system to each other. The cleaning chamber is configured such that two or more sub-chambers are each configured to be separately pressure-controlled. In some examples, two or more sub-chambers are each configured to be separately temperature-controlled. A first sub-chamber of the cleaning chamber can include a plurality of cleaning media provided therein. The cleaning media can include liquid, gas, and/or solid(s), depending upon the example. In some examples, two or more types of cleaning media can be disposed in the first sub-chamber and may be used simultaneously, as discussed in the multi-phase media examples above. The first sub-chamber and the third sub-chamber are separated by a second sub-chamber, the combination of these three sub-chambers can be referred to as a "sub-chamber stack." The component is fluidly coupled to the first sub-chamber via a first coupling mechanism and to a third sub-chamber via a second coupling mechanism. As used herein, "fluidly coupled" is used to refer to a configuration of a system such that two or more sub-chambers are connected by a path that allows gas and/or fluid to travel among, between, and/or through the sub-chambers.

In one example, the component includes at least one internal passage. The internal passage is fluidly coupled between the first sub-chamber and the third sub-chamber. The component can be removably coupled to each of the first and the second coupling mechanisms. As used here, "removably coupled" is used to refer to the coupling of two or more elements, such as a coupling mechanism and a component, which can subsequently be un-coupled without damage to either element. The coupling of the component to the cleaning system via each of the first and the second coupling mechanisms creates a path along the internal passage(s) for the cleaning media to travel from the first sub-chamber to the third sub-chamber through the internal passage(s). The component can be removably coupled to one or both of the first and second coupling mechanisms before or after the coupling mechanisms are removably coupled to, respectively, the first sub-chamber and the third sub-chamber. The component can be positioned in the second sub-chamber through different means. For example, the second sub-chamber can have a panel on one or more sides that is configured to open and close to allow for the positioning of the component therein. In another example, a first divider that separates the first sub-chamber from the second sub-chamber can be configured to open, close, or otherwise move to allow for the positioning of the component in the second sub-chamber. In still another example, a second divider that separates the third sub-chamber from the second sub-chamber can be configured to open, close, or otherwise move to allow for the positioning of the component in the second sub-chamber.

In this example, a pressure of the first sub-chamber is greater than a pressure of the third sub-chamber. This pressure differential between the first sub-chamber and the third sub-chamber causes a pressurized flow of cleaning media to form, and to travel from the first sub-chamber through the internal passage of the component to the third sub-chamber. As discussed herein, a "pressure cycle" includes activating and deactivating at least a vacuum system in the cleaning system, such that at least one pressurized flow of cleaning media is created from the first sub-chamber to the third sub-chamber. Multiple pressurized flows can be formed during a single pressure cycle as cleaning media is filtered and/or new cleaning media is introduced to the cleaning system. When a pressure cycle is terminated, pressurized flow ceases. The first pressure cycle removes a first plurality of contaminants from the internal passage of the component using one or more pressurized flows as the cleaning media passes from the first sub-chamber to the third sub-chamber through the internal passage. Once the cleaning media has traveled to the third sub-chamber, it can be filtered and transported from the third sub-chamber through a filtering system back to the first sub-chamber. The transportation of cleaning media that has passed through the component in the second sub-chamber through a filtering system and back into the first sub-chamber can be referred to herein as a "filtering cycle." The filtered cleaning media can be used for a second cleaning cycle for the component or for additional components that are later positioned in the system. In some examples, additional new cleaning media can be added to the first sub-chamber during the second or other subsequent cleaning cycles. One or more filtering cycles can occur during a pressure cycle. In some examples, no filtering cycles occur during a pressure cycle, rather, the used cleaning media is removed using a waste vessel, as discussed below.

During the one or more pressure cycles, the pressure differential is maintained across the sub-chambers to continue the pressurized flow of cleaning media. The systems discussed herein can include programmable logic that can be configured as one or more cleaning programs. In one example, each cleaning program includes one or more pressure cycles. The programmable logic can be executed using a graphical user interface (GUI). In another example, each cleaning program includes one or more pressure cycles and one or more filtering cycles that occur during the one or more pressure cycles. In still another example, each cleaning program includes one or more pressure cycles and one or more filtering cycles to be executed during or after the one or more pressure cycles. That is, the vacuum system may or may not be activated during a filtering cycle, since the filtering system can have its own mechanism by which to remove the cleaning media from the third sub-chamber, ensuring it does not fall back into the internal passage.

Methods of Cleaning Internal Passages

FIG. 1 is a flow chart of a method 100 of using a cleaning system according to examples of the present disclosure. At operation 102 of the method 100, a component is removably positioned and coupled to a cleaning system. The cleaning system discussed in the methods 100 and 200 below can be the cleaning systems 300 (FIG. 3) or 500 (FIG. 5) discussed in detail below. Operation 102 can occur in various manners. In one example of operation 102, the component is removably coupled to one or more coupling mechanisms prior to the coupling mechanisms being removably coupled to the cleaning system. In another example of operation 102, the coupling mechanisms are removably coupled to the cleaning system and the component is then removably coupled to each of the coupling mechanisms. In still another example of operation 102, one coupling mechanism can be coupled to the component prior to the component being coupled to the cleaning system, and the second coupling mechanism can be coupled to the system such that the component is coupled to the second coupling mechanism while it is already coupled to the cleaning system. The cleaning system can have various points of entry through which the component can be positioned therein.

The component coupled to the cleaning system at operation 102 can accumulate buildup of contaminants in its internal passage. In some examples, the component can further accumulate contaminants on its outside surface that may or may not be the same as the contaminants in the internal passage. The plurality of contaminants in the internal passage and/or the outside surface can make the component unusable or a risk to attempt to use for its intended purpose. In the example where the component is an aerospace component, the plurality of contaminants can render the aerospace component unsuitable for use since the contaminants can spread to other components in an assembly. The plurality of contaminants can additionally or alternatively act as an undesirable point of ignition during use or testing of the aerospace component. In the example where the component is an industrial equipment component, the plurality of contaminants can further contaminate the industrial equipment, as well as components that are fabricated by or serviced using the industrial equipment or developed in other ways. Exemplary industrial equipment can include coating, casting, injection molding, cleaning, food manufacture and packaging equipment, and inspection equipment which may utilize various fluids, gases, solids, colloidal solutions, or other process materials that can cause contamination. Further, use of the industrial equipment in manufacturing floor environments can lead to contamination on the internal passage and/or the external surface of the component.

At operation 104, a cleaning program is executed to remove a plurality of contaminants from the internal passage of the component. As discussed herein, the cleaning program executed at operation 104 can be stored on the cleaning system and/or on a remote server or other remote location accessible by the cleaning system via one or more remote technologies such as cloud computing technologies. The cleaning program executed at operation 104, as discussed above, can include one or more pressure cycles and one or more filtering cycles. Operation 104 is discussed in detail in FIG. 2.

At operation 106, the cleaning program optionally removes contaminants from the outside surface of the component. In one example, operation 104 is performed simultaneously with operation 106. In another example, operation 104 is performed in a partially overlapping fashion with operation 106. In yet another example, operation 104 is performed separately from, e.g., prior to or subsequent to, operation 106, such that the two operations do not overlap. Operation 106 can include introducing one or more cleaning media to a chamber. The cleaning media used for operation 106 can include one or more of liquid, gas, particles, or combinations thereof. The cleaning media used for operation 106 can include a surfactant, water, ambient air, or combinations thereof. The cleaning media used at operation 106 can be the same as the cleaning media used at operation 104. In other examples, the cleaning media used at operation 104 can be different from the cleaning media used at operation 104. In still other examples, the cleaning media used at operation 106 can include the cleaning media used at operation 104 in addition to one or more types of other cleaning media. The cleaning media used for operation 106 can be introduced in a single cycle and removed from the portion (referred to herein as a "sub-chamber) of the cleaning system where the component is positioned. In other examples, the cleaning media used for operation 106 can be introduced in a plurality of cleaning cycles, where the cleaning media is removed and filtered after each cleaning cycle and reintroduced to the portion of the cleaning system where the component is positioned. In some examples, which can be combined with other examples herein, the cleaning media used for operation 106 can be introduced in a plurality of cleaning cycles, where the cleaning media is removed after each cleaning cycle and new cleaning media is introduced for one or more subsequent cleaning cycles. In still other examples, the cleaning media used for operation 106 can be a combination of filtered cleaning media and new cleaning media.

At operation 108, the component is removed from the system subsequent to the pluralities of contaminants being removed from the internal passage at operation 104, and, optionally, from the outside surface of the component at operation 106. Various inspections and/or testing can occur after the component is removed to ensure that the contaminants have been removed from the internal passage and outside surface. Subsequent to operation 108, the component can be reassembled to an aerospace assembly (or other assembly), or to industrial equipment. In some examples, as discussed in detail below, when two or more internal passages of the component are to be cleaned, one or more apertures of the two or more internal passages can be blocked during the method 100. In this example, a first internal passage can be cleaned using at least operation 104 of the method 100 where the cleaning media is passed via the pressurized flow through the first internal passage. During subsequent iterations of the method 100, different apertures can be blocked and/or unblocked in order to direct the pressurized flow through one or more different internal passage(s).

Figure 2:
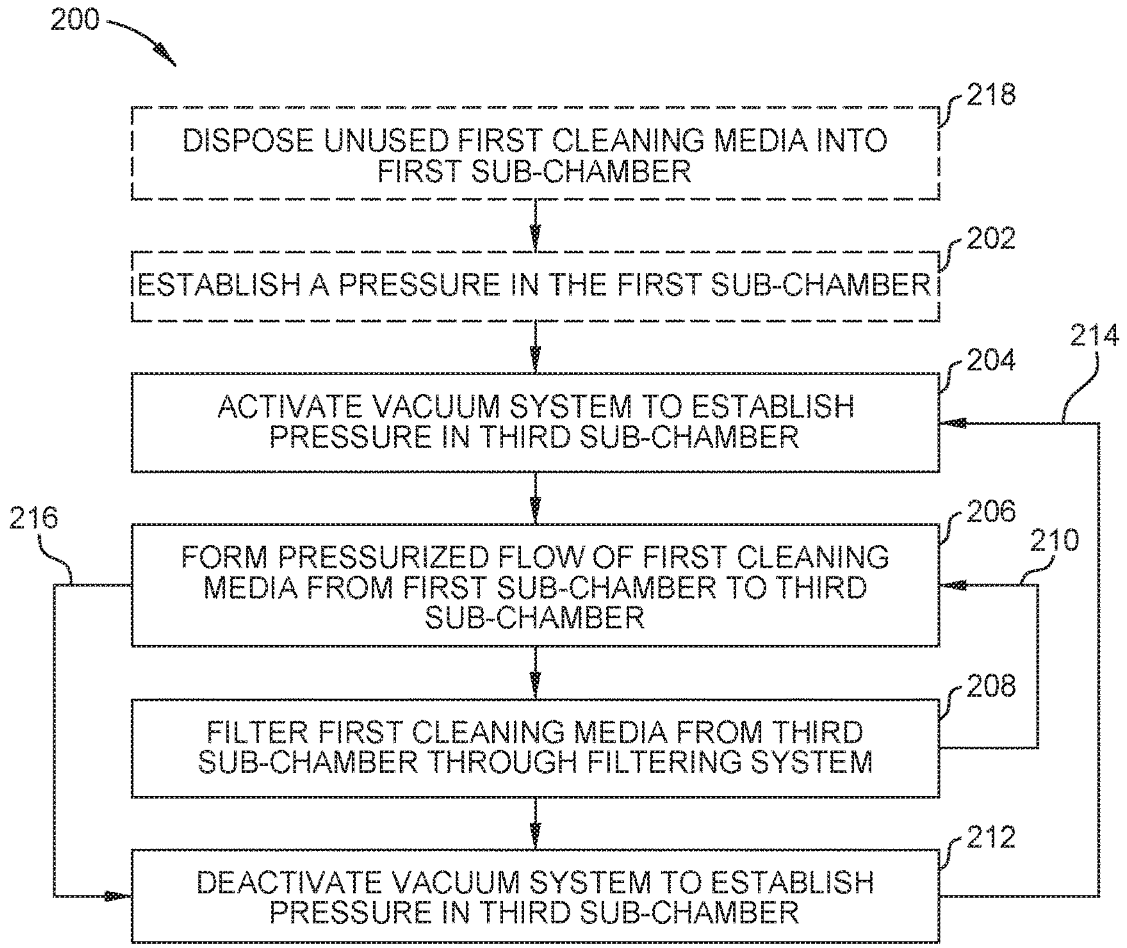
FIG. 2 depicts another example of flow chart of a method of using a cleaning system according to aspects of the present disclosure.

FIG. 2 depicts an example of flow chart of a method 200 of using a cleaning system according to aspects of the present disclosure. The method 200 is an example of the execution of the cleaning program at operation 104 of FIG. 1. At operation 202 of the method 200, a first pressure cycle is initiated. A pressure cycle is indicated by 214 in FIG. 2. At operation 202, a first pressure is established in the first sub-chamber. In one example, the first pressure of the first sub-chamber is about atmospheric pressure (1 atm). In other examples, the first pressure of the first sub-chamber can be from about 0.5 atm to about 1.5 atm. In still other examples, the first pressure of the first sub-chamber can be from about 0.8 atm to about 1.2 atm. In one example, during the first pressure cycle of the cleaning program in the method 200, a first rotational velocity of a first cleaning media is optionally created at operation 202 in a first sub-chamber of the cleaning system. In one example, the agitation of the first cleaning media can induce a plurality of bubbles in the first cleaning media. In other examples, the first cleaning media is positioned in the first sub-chamber but is not agitated/rotated in the first sub-chamber when the first sub-chamber is at the first pressure at operation 202.

The first cleaning media can include one or more of a fluid such as surfactant, a degreasing liquid, a degreasing gas, ambient air, nitrogen, $CO_2$, or combinations thereof. As used herein, a "degreasing" material (liquid or gas) is a material capable of removing contaminants from internal passages. As discussed above, the first cleaning media can include one or more constituents in a single phase or a multi-phase configuration. Depending upon the example, the first cleaning media is non-carcinogenic, can be biodegradable or have a low level of hydrocarbons, or not contain hydrocarbons. The first cleaning media can be selected as to be disposable into a waste system utilized by other systems without further processing, without pre-treatment, and without being a hazard to aquatic life. In some examples, the first cleaning media can be selected such that it does not appear on the Registration, Evaluation, Authorization, and Restriction of Chemicals (REACH) Authorization list. In other examples, a first cleaning media can be selected and disposed of in a closed-loop system where pre-treatment is performed to neutralize and/or reduce an environmental impact of the solvent prior to disposal.

In some examples, the first cleaning media can be a plurality of particles, or a multi-phase media including a plurality of particles. In one example, the plurality of particles can have an average diameter from about 0.5 mm to about 3.0 mm. In another example, the plurality of particles can have an average diameter from about 0.5 mm to about 1.0 mm. In still another example, the plurality of particles can have an average diameter from about 0.8 mm to about 2.0 mm. As used herein, "about" can mean that a stated target measurement, minimum measurement, or maximum measurement is within +/−5% of that measurement. The plurality of particles can include one or more of polymeric particles, ceramic particles, glass particles, or polymer-coated glass particles or ceramic particles. The plurality of particles can comprise a weight percentage (wt. %) of the first cleaning media from about 1% to about 50%. In another example, the plurality of particles can comprise a wt. % of the first cleaning media from about 2% to about 30%. In another example, the plurality of particles can comprise a wt. % of the first cleaning media from about 5% to about 20%. In still another example, the plurality of particles can comprise a wt. % of the first cleaning media from about 10% to about 30%. The type, size, and wt. % of particles in a cleaning media can be selected as to preserve (e.g., not damage) a coating and/or texture on the inside surface of the internal passage. In one example, further at operation 202, a rotational velocity of the first cleaning media can be established. In one example, the rotational velocity can be from about 1 meters/second (m/s) to about 50 m/s. In another example, the rotational velocity can be from about 5 m/s to about 40 m/s. In still another example, the rotation velocity can be from about 10 m/s to about 30 m/s. The rotational velocity can be established in either direction around a central axis of the cleaning system. In some examples, the rotational velocity can be changed from a first direction to a second direction during execution of the cleaning program.

At operation 204, during the first pressure cycle, a vacuum system of the cleaning system is activated to establish a second pressure in the third sub-chamber. The vacuum system can be coupled to a third sub-chamber of the cleaning system that is separated from the first sub-chamber by a second sub-chamber, the second sub-chamber having the component positioned therein. The second pressure in the third sub-chamber is less than the first pressure in the first sub-chamber, which establishes a pressure differential between the first sub-chamber and the second sub-chamber. In various examples, the second pressure is from about 0.01 Pascal (Pa) to about 1 Pa. In another example, the second pressure is from about 0.01 Pa to about 0.8 Pa. In another example, the second pressure is from about 0.25 Pa to about 1 Pa. The pressure differential between the first sub-chamber and the third sub-chamber promotes formation of a first pressurized flow of the first cleaning media at operation 206. The first pressurized flow formed at operation 206 travels through an at least one internal passage of the component, removing a plurality of contaminants during the first pressure cycle. At least a portion of the first cleaning media in the first sub-chamber is thereby transported via the pressurized flow to the third sub-chamber during operation 206. That is, the pressure differential between the first sub-chamber and the third sub-chamber, in combination with the fluid path formed by the component coupled thereto, causes the first cleaning media to be driven from the first sub-chamber to the third sub-chamber along the internal passage of the component, removing contaminants from the component. As discussed herein, a "fluid path" is a passageway configured to allow media such as liquid, gas, solids, or combinations thereof to travel fluidly therethrough, e.g., without obstruction of the media traveling within the passageway. Further, the second pressure in the third sub-chamber prevents the first cleaning media from falling back into the internal passage (which would re-contaminate the internal passage).

In an example where the first cleaning media is agitated at operation 202, the agitation, e.g., the rotational velocity of the first cleaning media, is maintained at operation 204. Accordingly, the pressurized flow created by the pressure differential between the first sub-chamber and the second sub-chamber can be referred to as a vortex as discussed above, since the pressurized flow will have a rotational velocity based upon the agitation of the first cleaning media. Each of the first, second, and third sub-chambers is configured by being sealed from an adjacent environment (as discussed below in FIG. 3) to enable the formation of independent pressures, temperatures, and chemical environments. A "chemical environment" as used herein is a region such as a sub-chamber that includes ambient air and/or one or more types of cleaning media that may be of varying chemistries and compositions.

In one example, the vacuum system can be deactivated at operation 212 to terminate the first pressure cycle subsequent to forming a pressurized flow at operation 206, as indicated by arrow 216. In some examples, prior to deactivation of the vacuum system at operation 212, the first cleaning media is removed from the third sub-chamber via a waste vessel after removing the plurality of contaminants from the internal passage. In this example, new, unused, first cleaning media can be delivered to the first sub-chamber at optional operation 218, and subsequent pressure cycles (indicated as arrow 214) can be executed.

In another example, a first filtering cycle is executed at operation 208 during a pressure cycle. In this example, at operation 208, the first cleaning media is removed from the third sub-chamber and transported through a filtering system. The filtering system is coupled to both the third sub-chamber and the first sub-chamber, and is configured to remove the plurality of contaminants from the internal passage of the component and form a filtered first cleaning media, which can also be referred to as a "recycled" first cleaning media. The filtered first cleaning media can be used, and re-filtered, in one or more filtering cycles as shown by arrow 210. Accordingly, one or more filtering cycles 210 can occur during a single pressure cycle 214. After each filtering cycle, the filtered first cleaning media is used (alone or in combination with new first cleaning media) to form subsequent pressurized flows. Subsequent to the one or more filtering cycles 210, the vacuum system can be deactivated at operation 212 to terminate the first pressure cycle, as indicated by arrow 216. In other examples, filtered first cleaning media (resulting from operation 208) may be used in combination with new first cleaning media that is introduced to the first sub-chamber at operation 218.

Thus, in the method 200, one or more pressure cycles 214 can be executed, and, within each pressure cycle 214, zero, one, or a plurality of filtering cycles 210 can occur. In one example, each pressure cycle 214 forms and dissipates a pressurized flow based on a pressure differential and the rotational velocity of the first cleaning media to transport the pressurized flow of first cleaning media through an internal passage of the component to remove a plurality of contaminants. In another example, each pressure cycle 214 forms a linear flow based on the pressure differential when no rotational velocity of the first cleaning media is established. The pressure of the first sub-chamber can be the same among and between pressure cycles 214. In other examples, the pressure of the first sub-chamber can vary among and between pressure cycles 214, or during a single pressure cycle 214 having two or more filtering cycles 210. The pressure of the third sub-chamber can be the same among and between pressure cycles 214. In other examples, the pressure of the third sub-chamber can vary among and between pressure cycles 214, or during a single pressure cycle 214 having two or more filtering cycles 210. Similarly, the rotational velocity of the first cleaning media optionally established at operation 202 can vary during a single pressure cycle 214 that includes one or more filtering cycles 210. In other examples, the rotational velocity of the first cleaning media optionally established at operation 202 can vary among and between two or more pressure cycles 214, each pressure cycle 214 including one or more filtering cycles 210.

In some examples, the component positioned in the second sub-chamber can include more than two apertures. In this example, the additional apertures can be plugged prior to initiating the first pressure cycle. In other examples, additional apertures may be coupled to additional internal passages of the component. The methods 100 and 200 can be used to remove contaminants from additional internal passages of the component by plugging and un-plugging apertures as appropriate to create a fluid path in one or more internal passages of the component. In still other examples, two or more internal passages can have pluralities of contaminants removed simultaneously depending upon the geometry of the internal passages.

Single-Sub-Chamber-Stack Cleaning System

Figure 3:
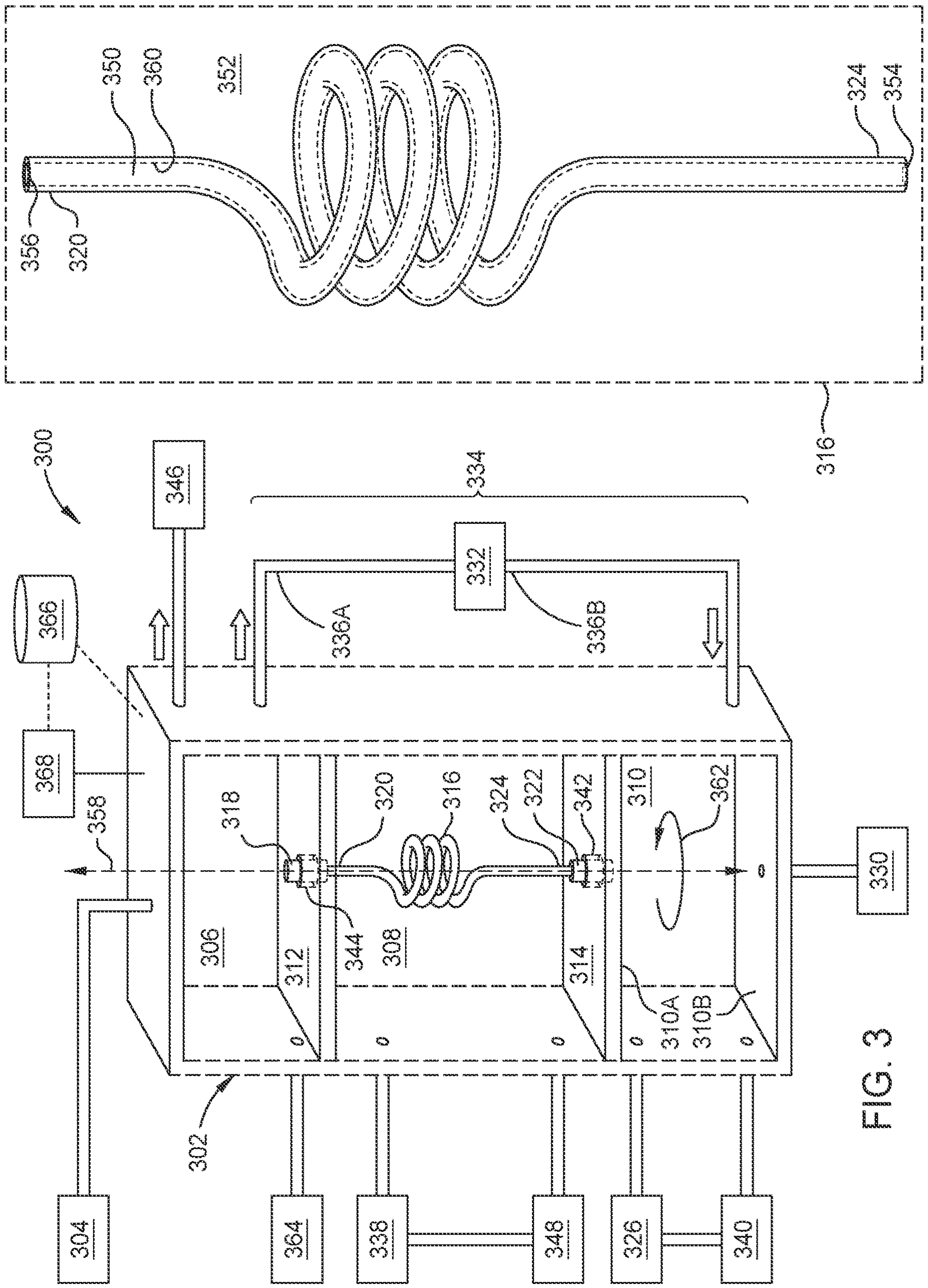
FIG. 3 depicts a cleaning system according to various aspects of the present disclosure.

FIG. 3 depicts a cleaning system 300 according to various aspects of the present disclosure. The cleaning system 300 can be used in the methods 100 and 200 discussed above. The plurality of programmable logic that can be configured as the one or more cleaning programs executed by the cleaning system can be stored on a non-transitory computer-readable medium such as the data store 366. The data store 366 can be local to the cleaning system 300, or can be accessed remotely by a plurality of hardware 368 included in the cleaning system 300. In other examples, the cleaning system 300 can be operated manually using one or more buttons, switches, or other elements to activate and enable the plurality of hardware 368.

The cleaning system 300 includes a chamber 302 which is divided into a plurality of sub-chambers, including a first sub-chamber 310. The first sub-chamber 310 is separated from a second sub-chamber 308 via a first divider 314. The first divider 314 is configured to isolate adjacent sub-chambers. When adjacent sub-chambers are isolated, one or more of a different pressure, temperature, or chemical environment can be established and maintained, such that each of the first sub-chamber 310 and the second sub-chamber 308 have at least one of a different pressure, temperature, or chemical environment. The second sub-chamber 308 is separated from an adjacent third sub-chamber 306 by a second divider 312. The combination of the first sub-chamber 310, the second sub-chamber 308, and the third sub-chamber 306 can be referred to as a "sub-chamber stack."

The first divider 314 includes at least one first aperture 342 that can also be described as a first through-hole. The first aperture 342 can be configured to accept a first coupling mechanism 322 to couple to a first end 324 of a component 316. The first coupling mechanism 322 can be positioned in the first aperture 342 and coupled thereto using one or more means as discussed herein. In one example, the component 316 as shown in the inset of 316 in FIG. 3 has an outside surface 352, a first end 324 having a first end aperture 354, a second end 320 having a second end aperture 356, and an inside surface 360 defining an internal passage 350. The internal passage 350 can be of varying dimensions and cross-sectional shapes, including polygons, circles, ellipses, triangles, or combinations of shapes. Depending upon the example, the internal passage 350 can have various coatings, a smoothness or a porosity, or other features that are not damaged by the methods discussed herein.

The component 316 can vary in shape and materials such as metals, alloys, polymers, ceramics, composite materials, or combinations of two or more materials. In various examples, the component 316 can have varying cross-sectional geometries of the internal passage 350. These geometries can include circular, elliptical, polygonal, or other geometries or combinations of geometries. In some examples, the internal passage 350 can taper in diameter from the first end 324 to the second end 320 of the component 316, or vice-versa. In other examples, the diameter and/or cross-sectional geometry can otherwise change along the length of the component 316. In some examples, the geometry of the component 316 can include a straight tubular structure, a corkscrew structure having one or more turns, a curved structure having one or more curves (e.g., such as an "S-shaped" bend), or other geometries or combinations of geometries. In still other examples, the component 316 can have more than two apertures. In this example, a plurality of internal passages can be defined by the two or more apertures. Some internal passages of the plurality of internal passages can be connected to each other, while other internal passages may not be connected to additional internal passages. In some examples, such as when various features of the cleaning system 300 are being tested or assembled, or when the cleaning system 300 is shipped, the component 316 is not part of the cleaning system 300.

Each of the first divider 314 and the second divider 312 can be formed from various materials, such as metal, alloy, ceramic, polymer, or combinations of materials. The second divider 312 includes a second aperture 344 that can also be described as a second through-hole. The first aperture 342 and the second aperture 344 are configured to form a fluid path through the second sub-chamber 308 regardless of whether or not the component 316 is positioned therein. The second aperture 344 can be configured to accept a second coupling mechanism 318 that is configured to couple to a second end 320 of the component 316. The second coupling mechanism 318 can be positioned in the second aperture 344 and coupled thereto using one or more means as discussed herein. Each of the first coupling mechanism 322 and the second coupling mechanism 318 can be configured as at least one of a press-fit mechanism, a clamp, an adhesive, or a magnetic chuck, or combinations thereof with respect to its ability to couple to the component 316. Accordingly, each of the first coupling mechanism 322 and the second coupling mechanism 318 can removably coupled to the component 316 using the same mechanism or different mechanisms, depending upon the example. In addition, each of the first coupling mechanism 322 and the second coupling mechanism 318 can be configured to couple to each of the first divider 314 and the second divider 312, respectively, as at least one of a press-fit mechanism, a clamp, an adhesive, or a magnetic chuck, or combinations thereof.

The component 316 is removably coupled to the second sub-chamber 308 via the first coupling mechanism 322 and the second coupling mechanism 318. This coupling can occur before or after one or both coupling mechanisms (318, 322) are coupled to each respective divider (312, 314). The first coupling mechanism 322 is configured to form a seal with the first divider 314. The seal formed between the first divider 314 and the first coupling mechanism 322 is formed in part by the fit of the first coupling mechanism 322 in the first aperture 342. Similarly, the second coupling mechanism 318 is configured to form a seal with the second divider 312. The seal formed between the second divider 312 and the first coupling mechanism 318 is formed in part by the fit of the second coupling mechanism 318 in the second aperture 344. Each seal is formed such that the first sub-chamber 310 remains isolated from the second sub-chamber 308, and the second sub-chamber 308 remains isolated from the third sub-chamber 306. Similarly to the first divider 314, the second divider 312 is configured to isolate adjacent sub-chambers such that each of the third sub-chamber 306 and the second sub-chamber 308 can have one or more of a different pressure, temperature, or chemical environment than the adjacent chamber. A plurality of sensors 364 may be coupled to the cleaning system 300. The plurality of sensors 364 can include pressure (leak) sensors, temperature sensors, or other sensors selected to further ensure that the sub-chambers remain isolated to promote at least the pressure differential used to create the pressurized flow. Depending upon the example, one or more cleaning programs can be configured to determine if leaks are present before, during, and after one or more pressure cycles of the cleaning system 300.

The second sub-chamber 308 can include one or more points of entry on one or more sides through which the component 316 is positioned in and removed from the second sub-chamber 308. Depending upon the example, the component 316 can be removed from the second sub-chamber 308 with or without removing one or both coupling mechanisms (318, 322) from the second sub-chamber. While a single component 316 is shown being positioned in the second sub-chamber 308, in other examples, multiple components can be positioned in the second sub-chamber 308 and may be cleaned simultaneously.

In FIG. 3, the first end 324 and the second end 320 are shown as being co-located along an axis 358. In other examples, the first end 324 and the second end 320 of the component may not be located along a shared axis. Accordingly, the first coupling mechanism 322 and the second coupling mechanism 318 may be configured to be adjustable to accept ends of the component 316 of varying diameters and shapes that do not have a shared axis. In some examples, which can be combined with other examples herein, the first coupling mechanism 322 and the second coupling mechanism 318 may be configured to be adjustable to accommodate various tube diameters. Further, each of the first coupling mechanism 322 and the second coupling mechanism 318 can be configured to allow for rapid clamping and unclamping of each of the first end 324 and the second end 320.

Each of the first sub-chamber 310 and the third sub-chamber 306 are shown in FIG. 3 as being substantially rectangular-shaped and having a substantially similar volume. Further, the second sub-chamber 308 is shown as being rectangular-shaped and having a larger size and volume. In other examples, the shapes and volumes of each of the first sub-chamber 310, second sub-chamber 308, and third sub-chamber 306 can vary. In still other examples, the second sub-chamber 308 may be configurable in various manners such that it is not a fully enclosed sub-chamber. This may be a desirable configuration where cleaning of the outside surface 352 of the component 316 is done using various tools and/or cleaning media or cleaning methods that are more readily performed with an open or partially open area where the second sub-chamber 308 is shown in FIG. 3.

A first cleaning media (not shown here) can be provided in a first vessel 340. The first vessel 340 is coupled to the first sub-chamber 310 to introduce the first cleaning media into the first sub-chamber 310. An agitator 330 is optionally coupled to the first sub-chamber 310. The agitator 330 can be a cyclone generator configured to optionally establish a rotational velocity 362 of the first cleaning media in the first sub-chamber 310. In other examples, the agitator 330 can be additionally or alternatively configured to introduce a plurality of bubbles into the first cleaning media. The agitator 330 can be configured to extend from the bottom 310B of the first sub-chamber 310, or from the top 310A of the first sub-chamber 310. Depending upon the example, the agitator 330 can include one or more propellers, tubes, or other elements configured to execute the functions of the agitators including the agitator 330 as discussed herein and in FIG. 5 below.

A first temperature controller 326 can be coupled to the first vessel 340 and/or to the first sub-chamber 310 and configured to control a temperature of the first cleaning media in the first vessel 340. In one example, a temperature of the first cleaning media in the first vessel 340 can be from about 15° C. to about 100° C. In another example, a temperature of the first cleaning media in the first vessel 340 can be from about 35° C. to about 80° C. In yet another example, a temperature of the first cleaning media in the first vessel 340 can be from about 15° C. to about 40° C. In another example, the first temperature controller can alternatively or additionally be configured to control a temperature of the first sub-chamber 310. In this example, the temperature of the first sub-chamber 310 can be from about 15° C. to about 40° C. In one example, the temperature of the first cleaning media in the first vessel 340 is substantially similar (e.g., within 5%, 3%, or 1%, depending upon the example) to the temperature of the first sub-chamber 310. In another example, the temperature of the first cleaning media in the first vessel 340 is different from (e.g., greater than 5% different from) the temperature of the first sub-chamber 310.

A second vessel 338 can be coupled to the second sub-chamber 308. The second vessel 338 contains a plurality of second cleaning media used to clean the outside surface 352 of the component 316, as discussed above in the method 100. The second cleaning media may be administered from the second vessel 338 as a liquid, spray, mist, or condensing vapor from a boiling pool of liquid. The second vessel 338 can be configured to transport the second cleaning media to the second sub-chamber 308. A second temperature controller 348 can be coupled to the second sub-chamber 308 and/or the second vessel 338. The second temperature controller 348 can be configured to control one or both of a temperature of the plurality of the second cleaning media in the second vessel 338 or the temperature of the second sub-chamber 308. In one example, the temperature of the second cleaning media in the second vessel 338 can be from about 15° C. to about 100° C. In another example, the temperature of the second cleaning media in the second vessel 338 can be from about 15° C. to about 40° C. In still another example, the temperature of the second cleaning media in the second vessel 338 can be from about 45° C. to about 80° C. Turning to the temperature of the second sub-chamber 308, in one example, it can be from about 15° C. to about 100° C. In another example, the temperature of the second sub-chamber can be from about 15° C. to about 40° C. In yet another example, the temperature of the second sub-chamber can be from about 35° C. to about 80° C. In one example, the temperature of the second cleaning media in the second vessel 338 is substantially similar (e.g., within 5%, 3%, or 1%, depending upon the example) to the temperature of the second sub-chamber 308. In another example, the temperature of the second cleaning media in the second vessel 338 is different from (e.g., greater than 5% different from) the temperature of the second sub-chamber 308.

A vacuum system 304 is coupled to the third sub-chamber 306. The vacuum system 304 can be configured in various manners, as discussed detail in FIG. 4. The vacuum system 304 is configured to establish a vacuum pressure in the third sub-chamber 306. The pressure established in the third sub-chamber 306 can be less than the pressure of the first sub-chamber, such that the pressure differential promotes formation of a pressurized flow of the first cleaning media through the component 316 in the second sub-chamber. It is appreciated that, if a component 316 is not positioned in the second sub-chamber 308, a fluid path still exists in the second sub-chamber, and a pressurized flow may still be created in response to the pressure differential. In that example, the fluid path created by the pressure differential can extend along a central axis of the second sub-chamber 308. Accordingly, the resulting pressurized flow can be used to clean or coat the second sub-chamber 308. In another example of when no component 316 is coupled to the cleaning system 300, the agitation, e.g., the rotational velocity, of the first cleaning media in the first sub-chamber 310 caused by the agitator 330 can be used to form a vortex to clean or coat the second sub-chamber 308.

A waste vessel 346 is coupled to the third sub-chamber 306 and is configured to remove the first cleaning media from the third sub-chamber 306. The first cleaning media can be removed from the third sub-chamber 306 after a pressure cycle is completed. In another example, the first cleaning media can be removed from the third sub-chamber 306 during one or more pressure cycles. A filtering system 334 is coupled to the first sub-chamber 310 and the third sub-chamber 306. The filtering system 334 includes one or more first conduits 336A coupled to the third sub-chamber 306 and an at least one filter 332. The waste vessel 346 can be configured to permanently remove first cleaning media that is not to be filtered. For example, the first cleaning media in the third sub-chamber 306, which can have contaminants in it that were removed from the internal passage of the component 316, is removed from the system 300 so that it does not fall back into the component 316 once the vacuum system 304 is deactivated and contaminate the component 316. When the filtering system 334 is used, the one or more first conduits 336A remove the used first cleaning media from the third sub-chamber 306. The at least one filter 332 is coupled to the one or more first conduits 336A and one or more second conduits 336B, the second conduits 336B are further coupled to the first sub-chamber 310. In some examples, a plurality of filters of varying materials, dimensions, and/or pore sizes can be used as the at least one filter 332. These materials can include various ceramics and composite materials. In one examples, the used first cleaning media is transported from the third sub-chamber 306 through the at least one 332 to remove the contaminants removed by the first cleaning media from the internal passage of the component 316. The filtered first cleaning media is then transported back to the first sub-chamber 310 via the one or more second conduits 336B. The filtered first cleaning media can also be referred to as a "recycled" first cleaning media. In one example, the filtered first cleaning media be used alone to form the pressurized flow(s). In another example, the filtered first cleaning media can be used in combination with new, unused cleaning media from the first vessel 340 to form one or more pressurized flows through the internal passage 350 during one or more pressure cycles.

Accordingly, the cleaning system 300 can be used to clean one or more internal passages 350 of a component 316. The cleaning system 300 can form multiple pressurized flows through the internal passage 350 of the component 316 during a pressure cycle while the vacuum system 304 is activated. During each pressurized flow, the first cleaning media is directed through the internal passage 350. Each pressure cycle can include one or more filtering cycles, during which the first cleaning media is transported from the third sub-chamber 306 through the filtering system 334 and back into the first sub-chamber 310. The cleaning system 300 thus removes contaminants and the first cleaning media from the internal passage 350, enabling the component 316 to be assembled back into industrial equipment or an aerospace assembly or other assembly.

Vacuum System

Figure 4:
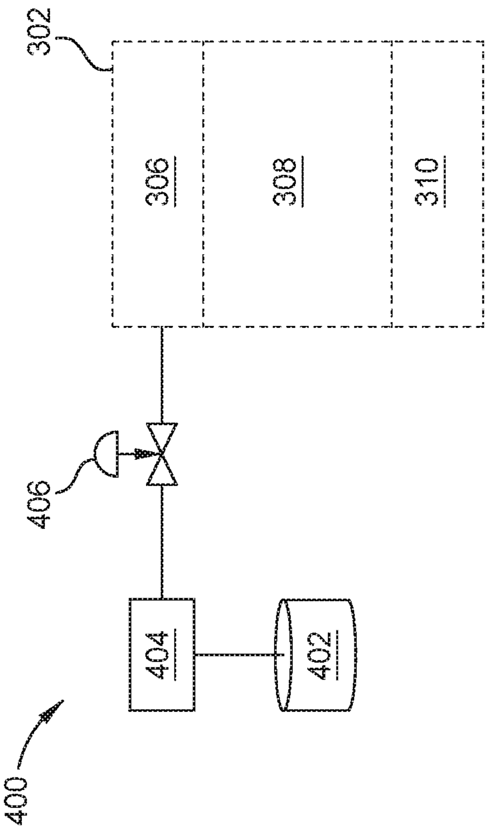
FIG. 4 depicts an example vacuum system according to various aspects of the present disclosure.

FIG. 4 depicts an example vacuum system 400 according to various aspects of the present disclosure. The example vacuum system 400 may be similar to the vacuum system 304 in FIG. 3 and can be configured to establish a pressure in the third sub-chamber 306. In this example, the vacuum system 400 includes a vacuum pump 402 coupled to a buffer chamber 404. The vacuum pump 402 is configured to establish a pressure in at least one sub-chamber of the cleaning chamber 302. The pressure established by the vacuum pump 402 can be from about 0.01 Pascal (Pa) to about 1 Pa. The buffer chamber 404 can be configured to modulate the pressure established by the vacuum pump 402 via a valve 406 that is coupled to both the buffer chamber 404 and the cleaning chamber 302. In some examples, the valve 406 can be coupled directly or indirectly to the third sub-chamber 306 of the cleaning chamber 302.

Multi-Sub-Chamber-Stack Cleaning System

Figure 5:
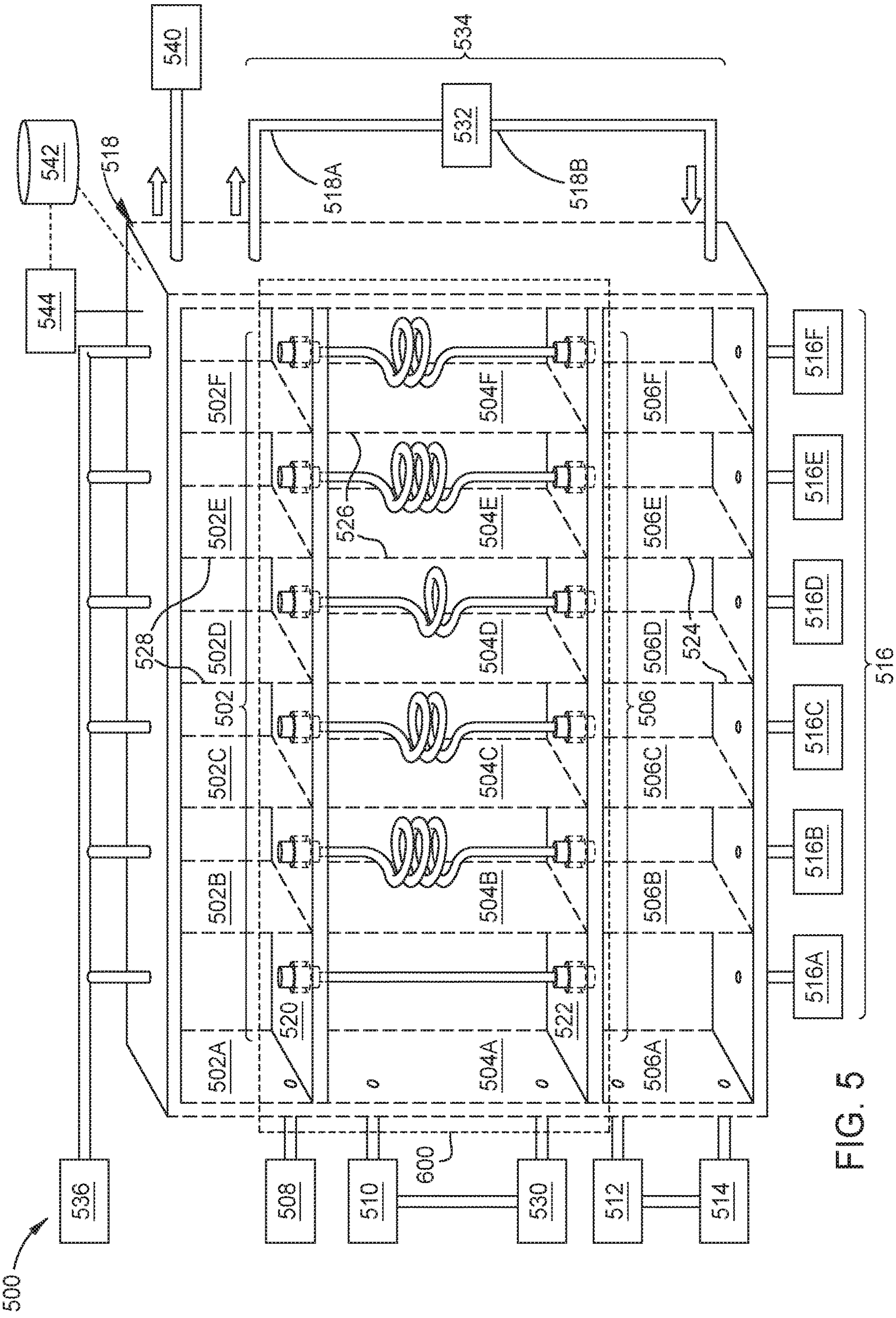
FIG. 5 depicts a cleaning system according to aspects of the present disclosure.

FIG. 5 depicts a cleaning system 500 according to aspects of the present disclosure. The plurality of programmable logic that can be configured as the one or more cleaning programs executed by the cleaning system 500 as discussed herein can be stored on a non-transitory computer-readable medium such as the data store 542. The data store 542 can be local to the cleaning system 500, or can be accessed remotely by a plurality of hardware 544 included in the cleaning system 500. In other examples, the cleaning system 500 can be operated manually using one or more buttons, switches, or other elements to activate and enable the plurality of hardware 544.

The cleaning system 500 includes a cleaning chamber 518 that is divided into a plurality of sub-chambers that form sub-chamber stacks. Each sub-chamber stack of the cleaning system 500 is configured to hold a plurality of components. The cleaning system 500 may be configured to execute one or more cleaning programs to remove contaminants from internal passages from one or more of the components. The cleaning system 500 can be further configured to remove contaminants from outside surfaces of one or more of the components. In the cleaning system 500, each cleaning chamber of the plurality of cleaning chambers 518 includes a first sub-chamber 506, a second sub-chamber 504, and a third sub-chamber 502. These sub-chambers (506, 504, 502) can each be further divided in order to form the plurality of sub-chamber stacks, each sub-chamber stack being configured to clean at least one component in one or more of a simultaneous, overlapping, and/or sequential fashion.

In one example, the second sub-chamber 504 is divided into a plurality of second sub-chambers, 504A, 504B, 504C, 504D, 504E, and 504F. Components may be positioned in one or more of the plurality of second sub-chambers 504A, 504B, 504C, 504D, 504E, and 504F in order to clean each component in one or more of a simultaneous, overlapping, and/or sequential fashion, for example, using the methods 100 and 200 discussed above. In some examples, the cleaning system 500 can have the first sub-chamber 506 subdivided into a plurality of first sub-chambers 506A, 506B, 506C, 506D, 506E, and 506F. In this example, a first divider 522 separates each of the plurality of first sub-chambers 506A, 506B, 506C, 506D, 506E, and 506F from an adjacent second sub-chamber, 504A, 504B, 504C, 504D, 504E, and 504F. Each of the plurality of first sub-chambers 506A, 506B, 506C, 506D, 506E, and 506F can be separated from adjacent first sub-chambers via a first plurality of dividers 524. Similarly, each of the plurality of second sub-chambers 504A, 504B, 504C, 504D, 504E, and 504F is separated from adjacent second sub-chambers via a second plurality of dividers 526. Each of the plurality of second sub-chambers 504A, 504B, 504C, 504D, 504E, and 504F is separated from a corresponding third sub-chamber 502 via a second divider 520.

The configuration of each the plurality of second sub-chambers 504A, 504B, 504C, 504D, 504E, and 504F, in particular the configuration when components are positioned therein, is discussed in detail in FIG. 6 below. In another example, which can be combined with any of the other examples herein, a third plurality of dividers 528 can be used to divide the third sub-chamber 502 into a plurality of third sub-chambers 502A, 502B, 502C, 502D, 502E, and 502F. As discussed above, each combination of sub-chambers that is configured to execute a cleaning program on a component can be referred to herein "sub-chamber stack." Accordingly, a first sub-chamber stack the cleaning system 500 would include 506A, 504A, and 502A, a second sub-chamber stack would comprise 506B, 504B, and 502B, and so on, as each sub-chamber stack includes a first sub-chamber (506X, where "X" is A, B, C, D, E, or F), a second sub-chamber (504X), and a third sub-chamber (502X).

A vacuum system 536 is coupled to a third sub-chamber 502 of the cleaning chamber 518. The vacuum system 536 can be similar to the vacuum system 400 in FIG. 4. In an example where the third sub-chamber 502 is divided into a plurality of third sub-chambers 502A, 502B, 502C, 502D, 502E, and 502F using the plurality of third dividers 528, the vacuum system 536 can be coupled to each of the plurality of third sub-chambers 502A, 502B, 502C, 502D, 502E, and 502F.

In an example where the first sub-chamber 506 is divided into the plurality of first sub-chambers 506A, 506B, 506C, 506D, 506E, and 506F, each can have a corresponding agitator (516A, 516B, 516C, 516D, 516E, and 516F) optionally coupled thereto. Each respective agitator (516A, 516B, 516C, 516D, 516E, and 516F) can be configured to generate a rotational velocity of a first cleaning media. In other examples, each respective agitator (516A, 516B, 516C, 516D, 516E, and 516F) can be configured to additionally or alternatively agitate the first cleaning media to induce a plurality of bubbles therein, depending upon whether a linear flow or a vortex is desired. A first vessel 514 can be configured to retain a supply of the first cleaning media. The first vessel 514 can be coupled to one or more of the plurality of first sub-chambers 506A, 506B, 506C, 506D, 506E, and 506F. The first cleaning media can be introduced into each of the plurality of first sub-chambers 506A, 506B, 506C, 506D, 506E, and 506F from the first vessel 514. A first temperature controller 512 can be coupled to the first vessel 514. The temperature of the first cleaning media in the first vessel 514 can be from about 15° C. to about 40° C. The first temperature controller 512 can be additionally or alternatively coupled to one or more of the plurality of first sub-chambers 506A, 506B, 506C, 506D, 506E, and 506F to modulate each respective temperature.

In some examples (not shown), each of the plurality of first sub-chambers 506A, 506B, 506C, 506D, 506E, and 506F has a separate temperature controller coupled thereto in order to individually control a temperature of the first cleaning media and/or each of the plurality of first sub-chambers 506A, 506B, 506C, 506D, 506E, and 506F. Each temperature of the plurality of first sub-chambers 506A, 506B, 506C, 506D, 506E, and 506F can be from about 15° C. to about 40° C. Further, at least one temperature of the plurality of first sub-chambers 506A, 506B, 506C, 506D, 506E, and 506F can be different from the temperatures of the other first sub-chambers of the plurality of first sub-chambers. In one example, the temperature of the first cleaning media in the first vessel 514 is substantially similar (e.g., within 5%, 3%, or 1%, depending upon the example) to the temperature of one or more of the plurality of first sub-chambers 506A, 506B, 506C, 506D, 506E, and 506F. In another example, the temperature of the first cleaning media in the first vessel 514 is different from (e.g., greater than 5% different from) the temperature of one or more of the plurality of first sub-chambers 506A, 506B, 506C, 506D, 506E, and 506F.

The vacuum system 536 is configured to establish a pressure differential from the plurality of first sub-chambers 506A, 506B, 506C, 506D, 506E, and 506F to the third sub-chamber 502 or the plurality of third sub-chambers 502A, 502B, 502C, 502D, 502E, and 502F in order to form one or more pressurized flows, one or more of which may be vortexes, of first cleaning media as discussed above in FIG. 3. A plurality of leak, temperature, and/or other sensors 508 may be configured to the system 500 in various configurations to further ensure that the sub-chambers remain fluidly isolated in order to promote at least the pressure differential used to create the pressurized flow.

A second vessel 510 is coupled to each of the plurality of second sub-chambers 504A, 504B, 504C, 504D, 504E, and 504F. The second vessel 510 is configured to introduce a second cleaning media to one or more of the plurality of second sub-chambers 504A, 504B, 504C, 504D, 504E, and 504F to clean an outside surface of a component (not shown) positioned therein. The second cleaning media may be administered from the second vessel 510 as a liquid, spray, mist, or condensing vapor from a boiling pool of liquid. In some examples, a second temperature controller 530 is coupled to one or both of the second vessel 510 and one or more of the plurality of second sub-chambers 504A, 504B, 504C, 504D, 504E, and 504F to modulate the temperature of the second cleaning media in the second vessel 510 or the temperature of the plurality of second sub-chambers 504A, 504B, 504C, 504D, 504E, and 504F.

In some examples (not shown here), each of the plurality of second sub-chambers 504A, 504B, 504C, 504D, 504E, and 504F has a separate temperature controller coupled thereto in order to individually control a temperature of the second cleaning media and/or a temperature of each of the plurality of second sub-chambers 504A, 504B, 504C, 504D, 504E, and 504F. In one example, the temperature of the second cleaning media in the second vessel 510 is substantially similar (e.g., within 5%, 3%, or 1%, depending upon the example) to the temperature of one or more of the plurality of second sub-chambers 504A, 504B, 504C, 504D, 504E, and 504F. In another example, the temperature of the second cleaning media in the second vessel 510 is different from (e.g., greater than 5% different from) the temperature of one or more of the plurality of second sub-chambers 504A, 504B, 504C, 504D, 504E, and 504F.

An example filtering system 534 is also shown in FIG. 5. The example filtering system 534 includes a first conduit 518A coupled to the third sub-chamber 502 and to an at least one filter 532. The one or more first conduits 518A remove the used first cleaning media from the third sub-chamber 502. The at least one filter 532 is coupled to the one or more first conduits 518A and one or more second conduits 518B. The second conduits 518B are further coupled to each of the plurality of first sub-chambers 506A, 506B, 506C, 506D, 506E, and 506F. In some examples, a plurality of filters of varying materials, dimensions, and/or pore sizes can be used as the at least one filter 532. The used first cleaning media is passed through the at least one filter 532 to remove the contaminants from the first cleaning media. The contaminants in the first cleaning media result from passing the first cleaning media through the internal passages of components (not shown) positioned in one or more of the plurality of second sub-chambers 504A, 504B, 504C, 504D, 504E, and 504F. The filtered first cleaning media is transported back one or more of the plurality of first sub-chambers 506A, 506B, 506C, 506D, 506E, and 506F via the one or more second conduits 518B. The filtered first cleaning media can also be referred to as "recycled" first cleaning media, and may be used alone or in combination with new, unused cleaning media from the first vessel 514 during one or more pressure cycles. As discussed above, multiple pressurized flows may be formed during a pressure cycle while the vacuum system 304 is activated.

In examples where the third sub-chamber 502 is divided into the plurality of third sub-chambers 502A, 502B, 502C, 502D, 502E, and 502F, a separate filtering system 534 and/or a separate first conduit 518A may be coupled to each of the plurality of third sub-chambers 502A, 502B, 502C, 502D, 502E, and 502F. Similarly, a separate second conduit 518B may be coupled to one or more of the plurality of first sub-chambers 506A, 506B, 506C, 506D, 506E, and 506F. In one example, the filtering system 534 can be configured to return filtered cleaning media from a third sub-chamber of a particular sub-chamber stack to the first sub-chamber of the same stack, e.g., from 506A to 502A. In another examples, the filtering system 534 can be configured to return filtered cleaning media from a third sub-chamber of a particular sub-chamber stack to a first sub-chamber of another, different stack, e.g., from 506A to 502B, 502C, 502D, 502E, or 502F. Similarly to the waste vessel 346 in FIG. 3, a waste vessel 540 can be coupled to one or more of the plurality of third sub-chambers 502A, 502B, 502C, 502D, 502E, and 502F, and can remove the first cleaning media permanently from the system.

In one example, the one or more cleaning programs associated with the cleaning system 500 can be executed in each sub-chamber stack simultaneously. In other examples, the one or more cleaning programs associated with the cleaning system 500 can be executed in each sub-chamber stack independently with no overlap. This independent execution may occur in series in various orders or combinations of orders. In still other examples, the one or more cleaning programs associated with the cleaning system 500 can be executed in an overlapping fashion with the execution of a first cleaning program in a first sub-chamber stack overlapping for a portion of the execution of a second cleaning program in a second sub-chamber stack.

Figure 6:
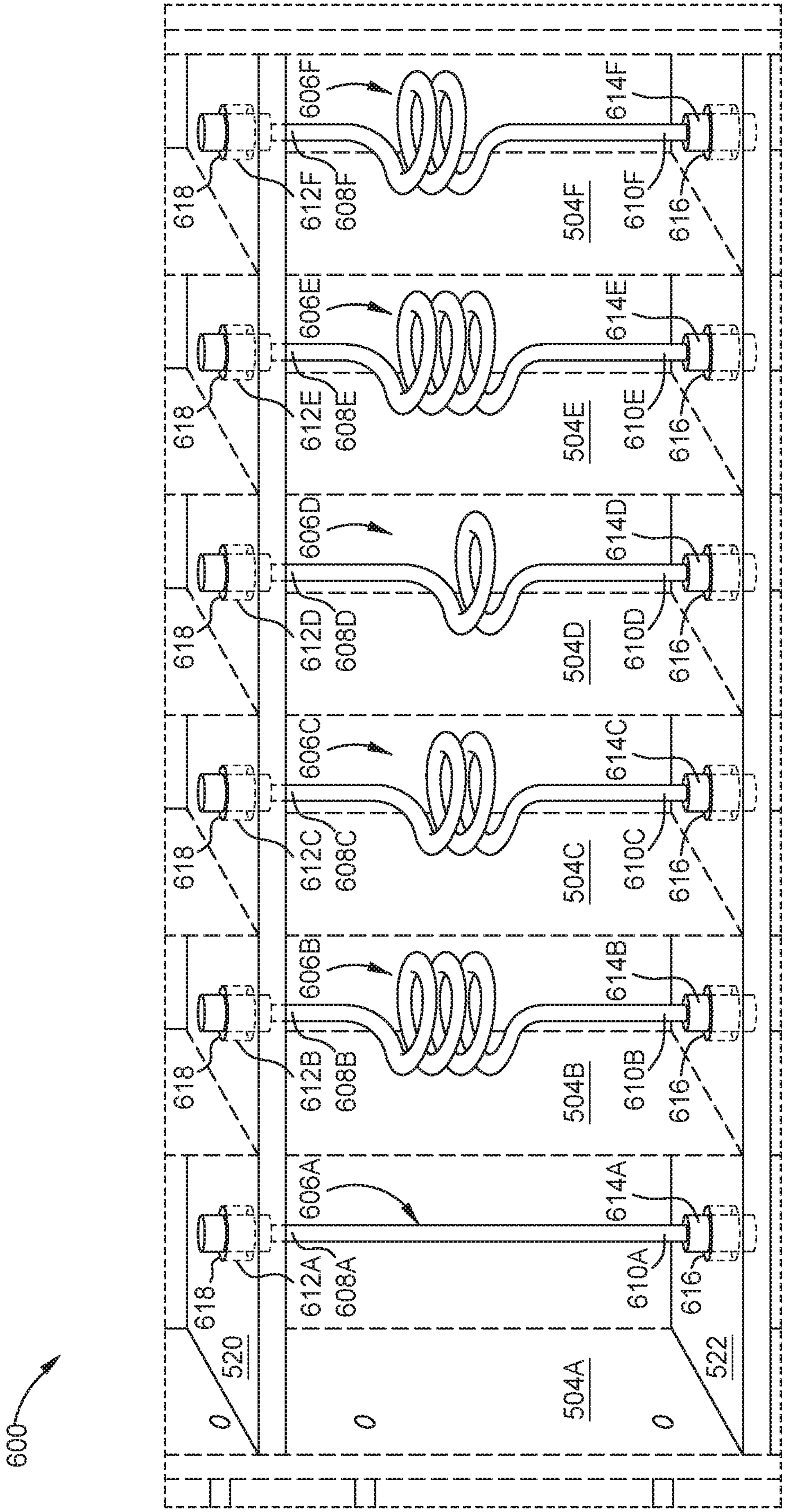
FIG. 6 depicts a portion of a cleaning system according to aspects of the present disclosure.

FIG. 6 depicts a portion 600 of the cleaning system 500 according to aspects of the present disclosure. The portion 600 of the cleaning system 500 in FIG. 6 shows the plurality of second sub-chambers 504A, 504B, 504C, 504D, 504E, and 504F in more detail. In FIG. 6, each of the plurality of second sub-chambers 504A, 504B, 504C, 504D, 504E, and 504F has a component (606A, 606B, 606C, 606D, 606E, 606F) positioned therein. In other examples of the system 500, less than all of the plurality of second sub-chambers 504A, 504B, 504C, 504D, 504E, and 504F has a component positioned therein. In some examples, none of the plurality of second sub-chambers 504A, 504B, 504C, 504D, 504E, and 504F has a component positioned therein and the cleaning programs can be executed to clean plurality of second sub-chambers 504A, 504B, 504C, 504D, 504E, and 504F.

As shown in FIG. 6, each component 606A, 606B, 606C, 606D, 606E, 606F has an outside surface, a first end 610A, 610B, 610C, 610D, 610E, 610F, and a second end 608A, 608B, 608C, 608D, 608E, 608F. Further, each component 606A, 606B, 606C, 606D, 606E, 606F has an at least one internal passage (not shown here, but similar to internal passage 350 in FIG. 3) extending there-through from each first end 610A, 610B, 610C, 610D, 610E, 610F to each corresponding second end 608A, 608B, 608C, 608D, 608E, 608F. Each internal passage of each component 606A, 606B, 606C, 606D, 606E, 606F thus forms a path for a pressurized flow, which can be a linear flow or a vortex, as discussed above.

Each of the first ends 610A, 610B, 610C, 610D, 610E, 610F is removably coupled to a respective first coupling mechanism 614A, 614B, 614C, 614D, 614E, 614F. Similarly, each of the second ends 608A, 608B, 608C, 608D, 608E, 608F is coupled to a respective second coupling mechanism 612A, 612B, 612C, 612D, 612E, 612F. The first divider 522 has a first plurality of through-holes 616. Each first coupling mechanism 614A, 614B, 614C, 614D, 614E, 614F is at least partially disposed in a through-hole of the plurality of through-holes 616. The second divider 520 has a second plurality of through-holes 618 in which each second coupling mechanism 612A, 612B, 612C, 612D, 612E, 612F is respectively at least partially disposed. There is a first seal formed between each first coupling mechanism 614A, 614B, 614C, 614D, 614E, 614F and the first plurality of through-holes 616. Similarly, there is a second seal formed between each second coupling mechanism 612A, 612B, 612C, 612D, 612E, 612F and the second plurality of through-holes 618. Accordingly, because of the seals created, each first sub-chamber 506, second sub-chamber 504, and third sub-chamber 502 maintains at least one of a separate and/or different pressure, temperature, and chemical environment. As discussed above, the chemical environments of each sub-chamber can differ and may contain: ambient air and/or one or more types of cleaning media that may be of varying chemistries and compositions. For example, various sub-chambers can contain different types (compositions or phases) of cleaning media, a filtered cleaning media, or a new cleaning media.

Thus, the systems and methods discussed herein efficiently and effectively remove contaminants from the internal passages and/or outside surfaces of various types of components without leaving harmful residue behind. The cleaning methods discussed herein can be executed in a timely fashion, more rapidly than current cleaning methods while achieving a cleanliness level equal to or greater than those methods. The cleaning methods and systems discussed herein additionally clean the components discussed herein without negatively impacting the dimensional integrity nor the surface finish(es) and/or coatings of the components. The components can subsequently be returned to the industrial equipment or assemblies such as aerospace assemblies, and the industrial equipment or assembly can be operated or otherwise used without the negative impacts caused by contaminants in the internal passages nor by residue left by cleaning media in the internal passages.

In the current disclosure, reference is made to various aspects. However, it should be understood that the present disclosure is not limited to specific described aspects. Instead, any combination of the abovementioned features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A cleaning system, comprising:

a cleaning chamber, comprising:

a first sub-chamber configured to retain a first cleaning medium, the first cleaning medium comprising a plurality of particles having an average diameter of about 0.5 mm to about 3 mm, the plurality of particles being selected from the group consisting of polymeric particles, ceramic particles, glass particles, polymer-coated glass particles, polymer-coated ceramic particles, and combinations thereof;

an agitator coupled to the first sub-chamber, the agitator including one or more propellers configured to initiate and maintain a rotational velocity of the first cleaning medium;

a second sub-chamber adjacent to the first sub-chamber;

a component positioned in the second sub-chamber;

a first divider positioned between the first sub-chamber and the second sub-chamber, the first divider having a first aperture formed therein;

a third sub-chamber adjacent to the second sub-chamber and configured to receive the first cleaning medium;

a second divider positioned between the second sub-chamber and the third sub-chamber, the second divider having a second aperture formed therein, the first aperture and the second aperture being configured to form a fluid path through the second sub-chamber; and a vacuum system coupled to the third sub-chamber, the vacuum system being configured to generate a pressure in the third sub-chamber that is less than a pressure of the first sub-chamber to induce a pressurized flow of the first cleaning medium from the first sub-chamber to the third sub-chamber, wherein the vacuum system further comprises:

a vacuum pump to establish a pressure in at least one sub-chamber of the cleaning chamber;

a buffer chamber directly coupled to the vacuum pump to modulate the pressure established by the vacuum pump; and a valve coupled to the buffer chamber and the third sub-chamber of the cleaning chamber; and a filtering system coupled to the cleaning chamber and configured to filter the first cleaning medium; and a computer programmed to perform an operation of using the first cleaning medium to clean an inside surface of the component, and an operation of using a second cleaning medium to clean an outside surface of the component, wherein the two operations do not overlap with each other.

2. The cleaning system of claim 1, further comprising:

a first coupling mechanism removably coupled to the first divider via the first aperture; and a second coupling mechanism removably coupled to the second divider via the second aperture.

3. The cleaning system of claim 2, wherein: the component positioned in the second sub-chamber further comprises:

a first end being removably coupled to the first coupling mechanism, a second end being removably coupled to the second coupling mechanism, wherein the inside surface of the component defines an internal passage extending from the first end to the second end.

4. The cleaning system of claim 2, wherein each of the first coupling mechanism and the second coupling mechanism comprises a press-fit mechanism, a clamp, an adhesive, a magnetic chuck, or a combination thereof.

5. The cleaning system of claim 1, further comprising a first temperature sensor coupled to the first sub-chamber.

6. The cleaning system of claim 1, further comprising a first vessel coupled to the first sub-chamber, the first vessel having the first cleaning medium therein and being configured to transport the first cleaning medium into the first sub-chamber.

7. The cleaning system of claim 1, further comprising a second vessel coupled to the second sub-chamber, the second vessel having the second cleaning medium and being configured to transport the second cleaning medium into the second sub-chamber.

8. A cleaning system, comprising:

a plurality of cleaning chambers, each cleaning chamber of the plurality of cleaning chambers comprising:

a first sub-chamber, the first sub-chamber configured to retain a first cleaning medium;

an agitator coupled to the first sub-chamber, the agitator including one or more propellers being configured to initiate and maintain a rotational velocity of the first cleaning medium;

a second sub-chamber adjacent to the first sub-chamber;

a component positioned in the second sub-chamber, the component comprising an internal passage;

a first divider positioned between the first sub-chamber and the second sub-chamber, the first divider having a plurality of first apertures formed therein;

a third sub-chamber adjacent to the second sub-chamber and configured to receive the first cleaning medium; and a second divider positioned between the second sub-chamber and the third sub-chamber, the second divider having a plurality of second apertures formed therein;

a vacuum system coupled to the third sub-chamber of each cleaning chamber of the plurality of cleaning chambers, the vacuum system comprising a vacuum pump, a buffer chamber, and a valve;

a plurality of leak sensors coupled to the plurality of cleaning chambers; and a filtering system coupled to the plurality of cleaning chambers, the filtering system being configured to filter the first cleaning medium; and a computer programmed to perform an operation of using the first cleaning medium to clean an inside surface of the component, and an operation of using a second cleaning medium to clean an outside surface of the component, wherein the two operations do not overlap with each other.

9. The cleaning system of claim 8, further comprising:

a first coupling mechanism removably coupled to the first divider of each cleaning chamber of the plurality of cleaning chambers via one of the plurality of first apertures; and a second coupling mechanism removably coupled to the second divider of each cleaning chamber of the plurality of cleaning chambers via one of the plurality of second apertures.

10. The cleaning system of claim 9, wherein the component positioned in the second sub-chamber of each cleaning chamber of the plurality of cleaning chambers further comprises:

a first end being removably coupled to the first coupling mechanism, a second end being removably coupled to the second coupling mechanism, and wherein the inside surface of the component defines the internal passage extending from the first end to the second end.

11. The cleaning system of claim 8, further comprising a first vessel coupled to the first sub-chamber of each cleaning chamber of the plurality of cleaning chambers, the first vessel including the first cleaning medium and being configured to transport the first cleaning medium into the first sub-chamber of each cleaning chamber of the plurality of cleaning chambers.

12. The cleaning system of claim 8, further comprising a second vessel coupled to the second sub-chamber of each cleaning chamber of the plurality of cleaning chambers, the second vessel including the second cleaning medium and being configured to transport the second cleaning medium into the second sub-chamber of each cleaning chamber of the plurality of cleaning chambers.

13. The cleaning system of claim 8, further comprising a pressure sensor coupled to the first sub-chamber of each cleaning chamber of the plurality of cleaning chambers, the second sub-chamber of each cleaning chamber of the plurality of cleaning chamber, or the third sub-chamber of each cleaning chamber of the plurality of cleaning chambers.

14. A method of using a cleaning system, comprising:

providing the cleaning system of claim 1;

executing a computer readable program code to perform a cleaning program, wherein the cleaning program comprises:

initiating a first pressure cycle wherein the first cleaning medium is in the first sub-chamber and the first sub-chamber has a first pressure;

activating, during the first pressure cycle, the vacuum system to establish a second pressure in the third sub-chamber, the second pressure being less than the first pressure, wherein the component is removably coupled to the first sub-chamber via a first coupling mechanism and to the third sub-chamber via a second coupling mechanism;

agitating, during the first pressure cycle, the first cleaning medium to establish a rotational velocity of the first cleaning medium using the agitator;

forming, during the first pressure cycle, in response to the second pressure being less than the first pressure, a first pressurized flow of the first cleaning medium from the first sub-chamber through at least one internal passage of the component to the third sub-chamber to remove contaminants from the at least one internal passage of the component; and de-activating, during the first pressure cycle, the vacuum system, wherein the first pressurized flow of the first cleaning medium is not present in the second sub-chamber when the vacuum system is deactivated.

15. The method of claim 14, wherein the cleaning program comprises a first filtering cycle comprising:

transporting the first cleaning medium from the third sub-chamber to the filtering system, wherein the filtering system removes contaminants from the first cleaning medium to form a filtered first cleaning medium; and transporting, via the filtering system, the filtered first cleaning medium to the first sub-chamber.

16. The method of claim 14, wherein the cleaning program includes executing a plurality of filtering cycles during a pressure cycle prior to de-activating the vacuum system.

17. The method of claim 15, further comprising, subsequent to the first filtering cycle:

creating, during a second pressure cycle, a rotational velocity of the filtered first cleaning medium while the first sub-chamber is at the first pressure;

activating, during the second pressure cycle, the vacuum system to establish a third pressure in the third sub-chamber while the component is removably coupled to the first sub-chamber via the first coupling mechanism and to the third sub-chamber via the second coupling mechanism, the third pressure being less than the first pressure; and forming, during the second pressure cycle, in response to the third pressure being less than the first pressure, a second flow of the first cleaning medium from the first sub-chamber through the at least one internal passage of the component to the third sub-chamber to remove contaminants from the at least one internal passage of the component.

18. The method of claim 14, further comprising:

disposing, during the performing of the cleaning program, the second cleaning medium into the second sub-chamber to remove contaminants from the outside surface of the component.

19. The method of claim 14, wherein the first pressure is about atmospheric pressure and the second pressure is about 0.01 Pascal (Pa) to about 1 Pa.

20. The method of claim 14, wherein the first cleaning medium is selected from the group consisting of: a surfactant, a degreasing liquid, a degreasing gas, ambient air, nitrogen, C02, and combinations thereof.

21. The method of claim 20, wherein the plurality of particles comprises about 1 wt % to about 50 wt % of the first cleaning medium.

22. The method of claim 21, wherein the plurality of particles comprise an average diameter of about 0.5 mm to 1 mm.

23. The method of claim 14, wherein the agitator includes a tube.

* * * * *